Dec. 12, 1944.  H. H. TALBOYS ET AL  2,364,879
RAIL GRINDER
Filed Jan. 7, 1942  8 Sheets-Sheet 1
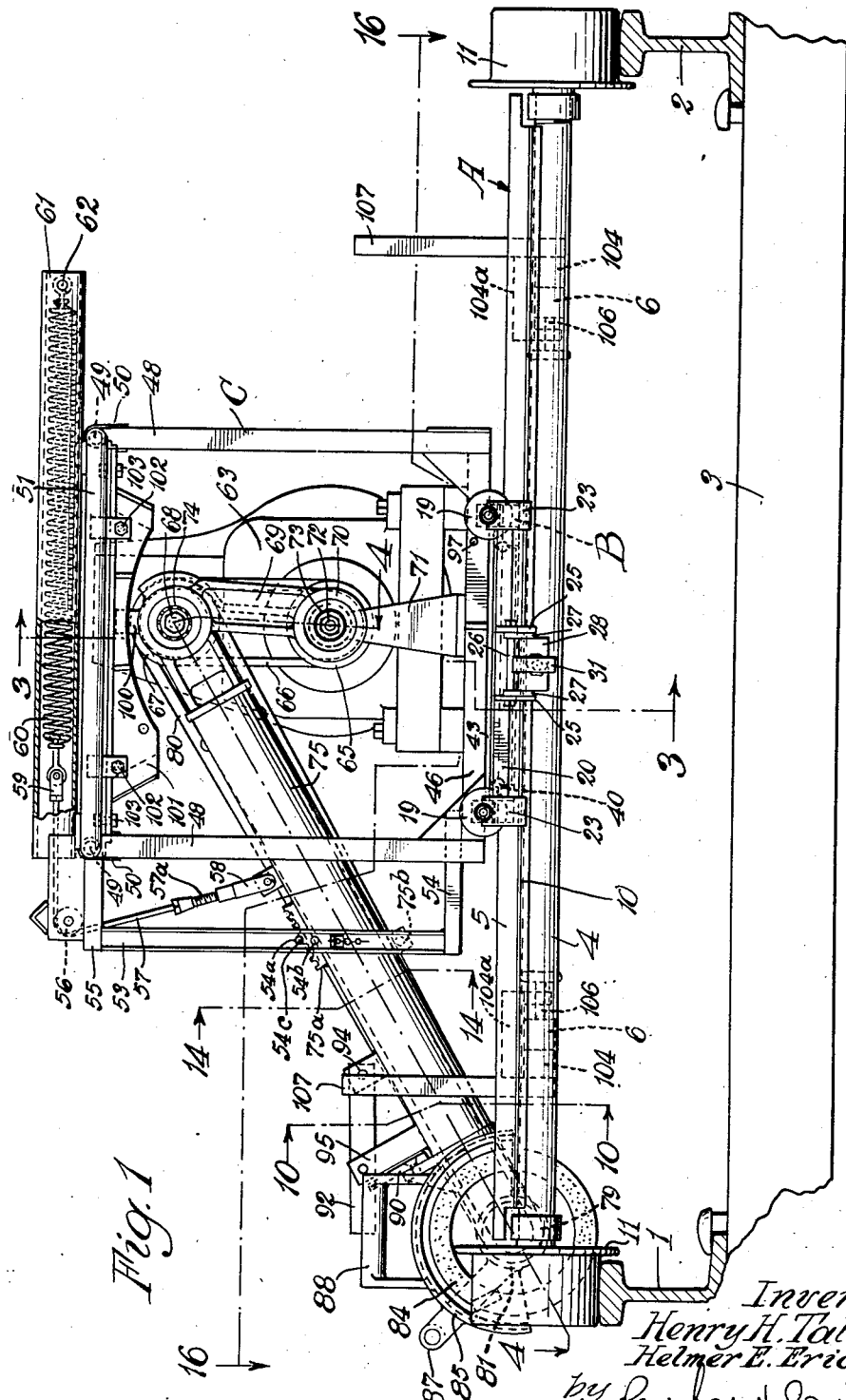
Inventors.
Henry H. Talboys
Helmer E. Erickson
by Parker & Carter
Attorneys

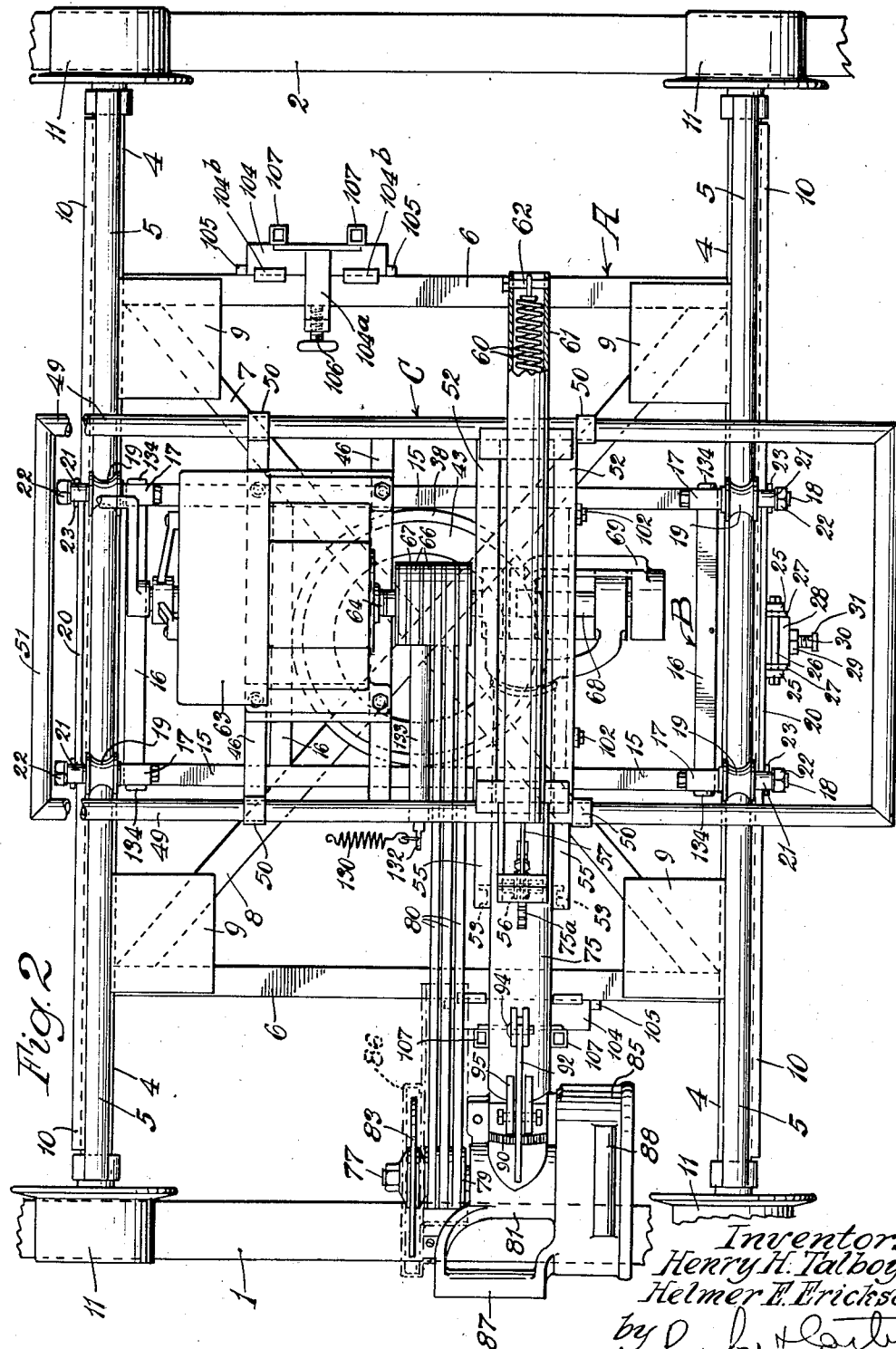

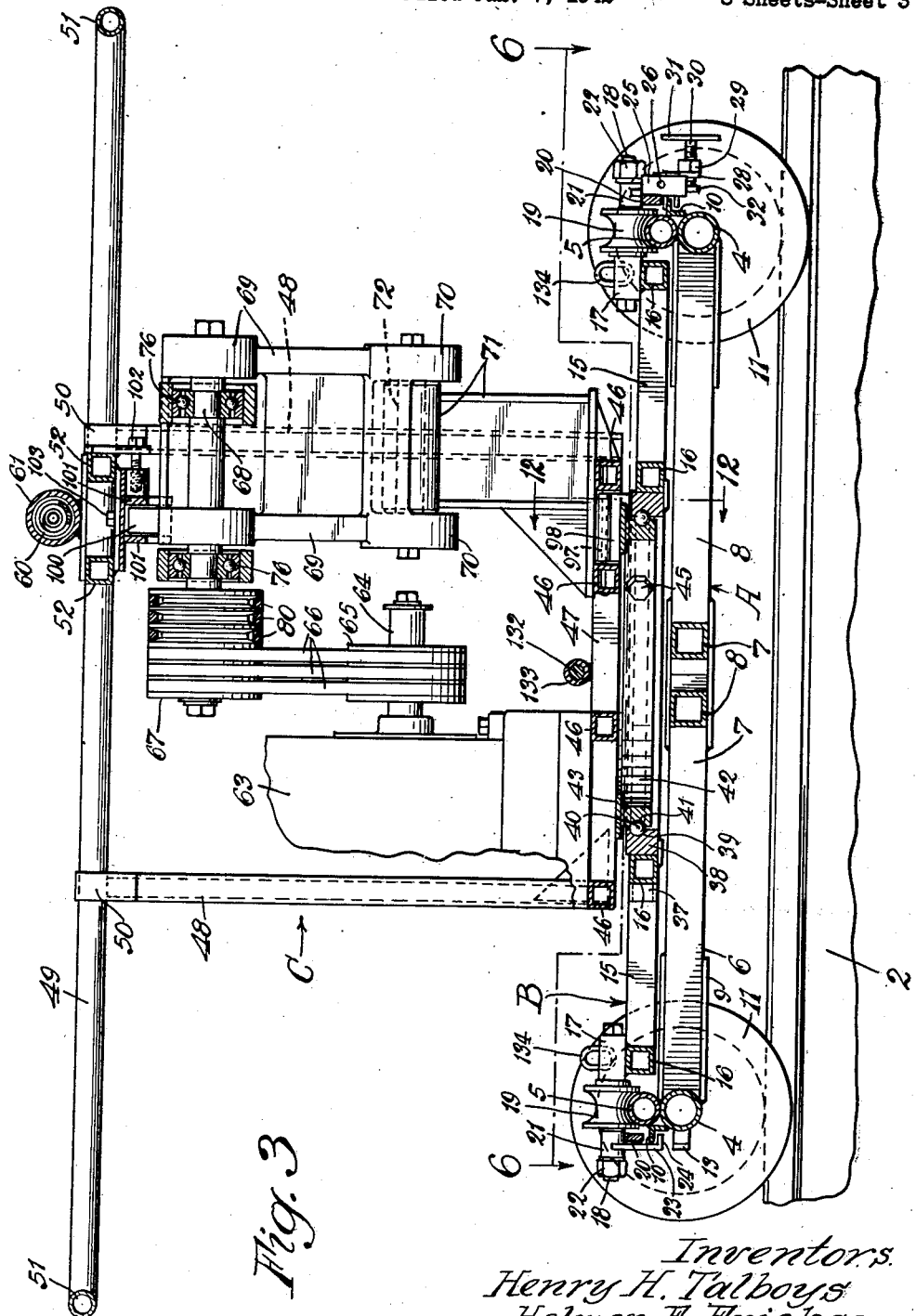

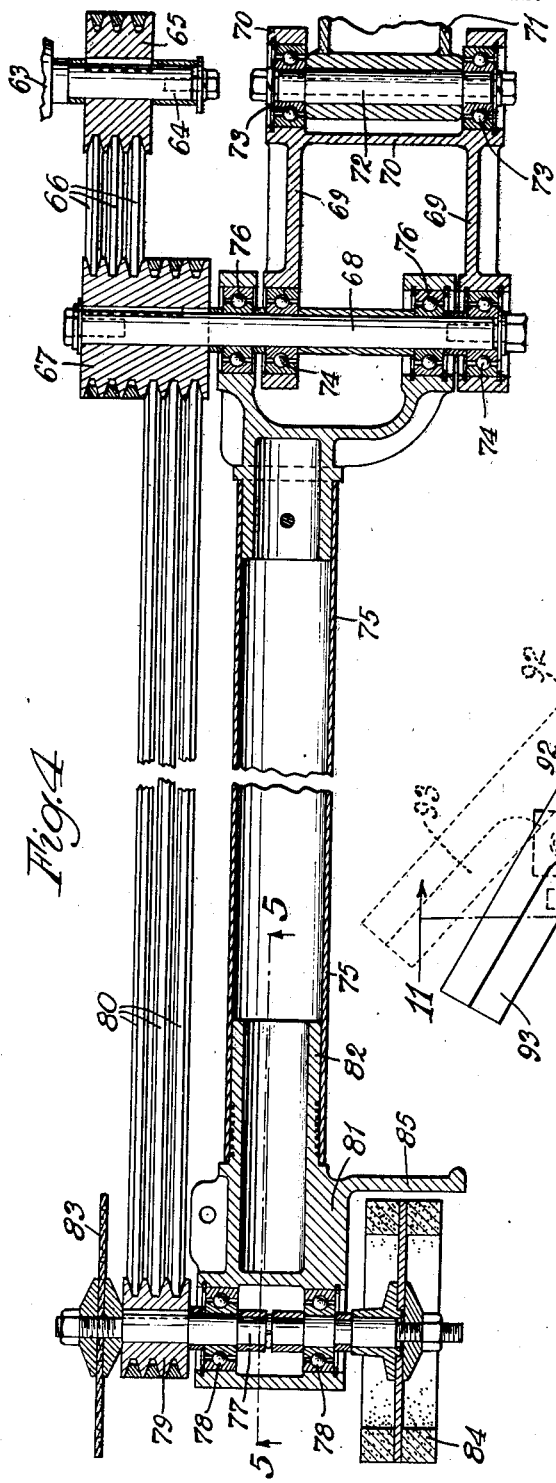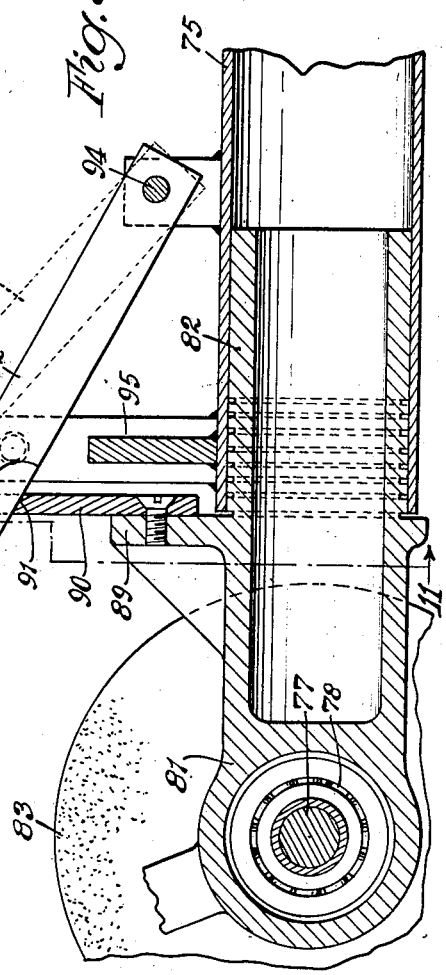

Dec. 12, 1944.  H. H. TALBOYS ET AL  2,364,879
RAIL GRINDER
Filed Jan. 7, 1942  8 Sheets-Sheet 5
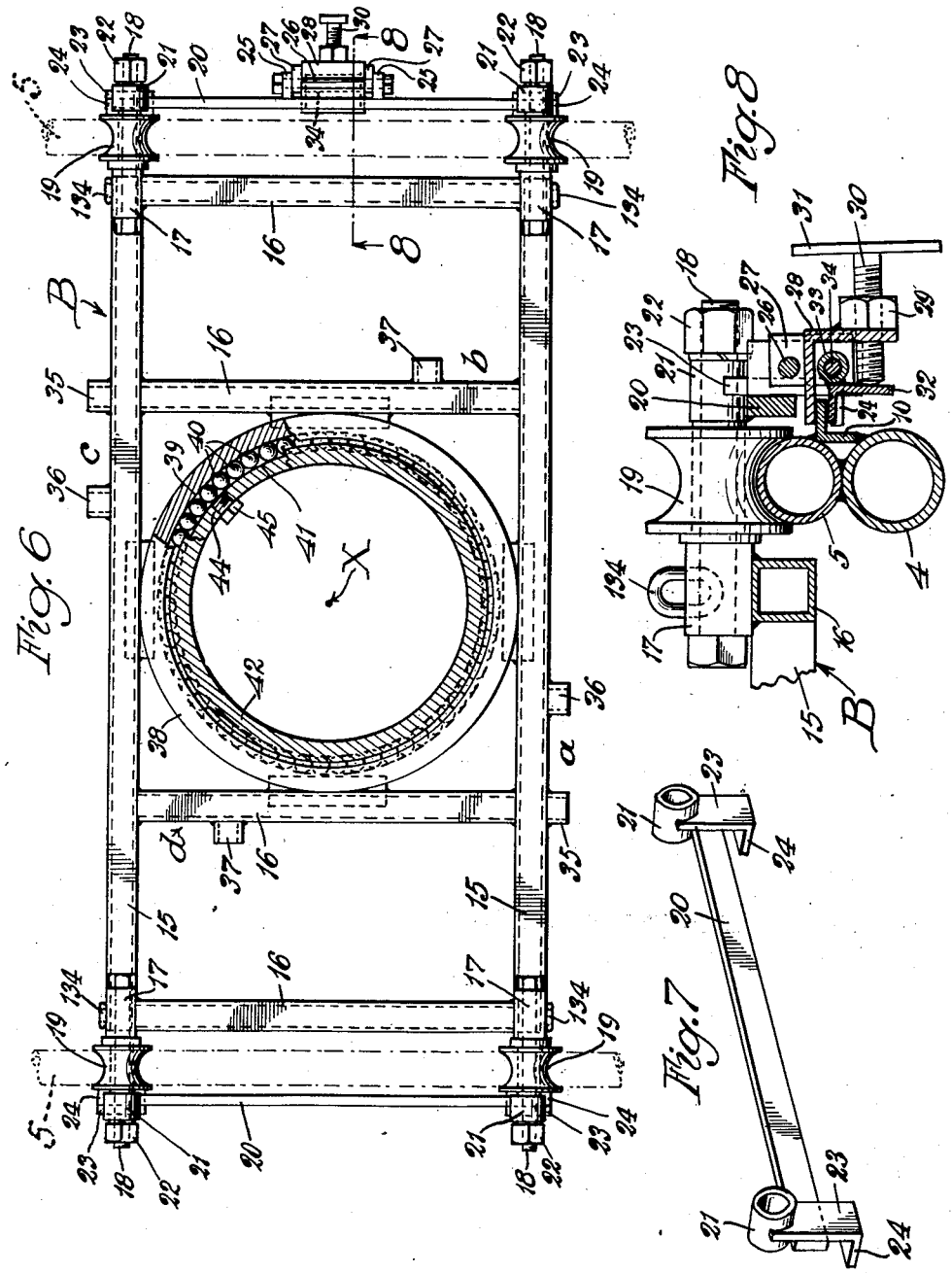
Inventors
Henry H. Talboys
Helmer E. Erickson
by Parker & Carter
Attorneys

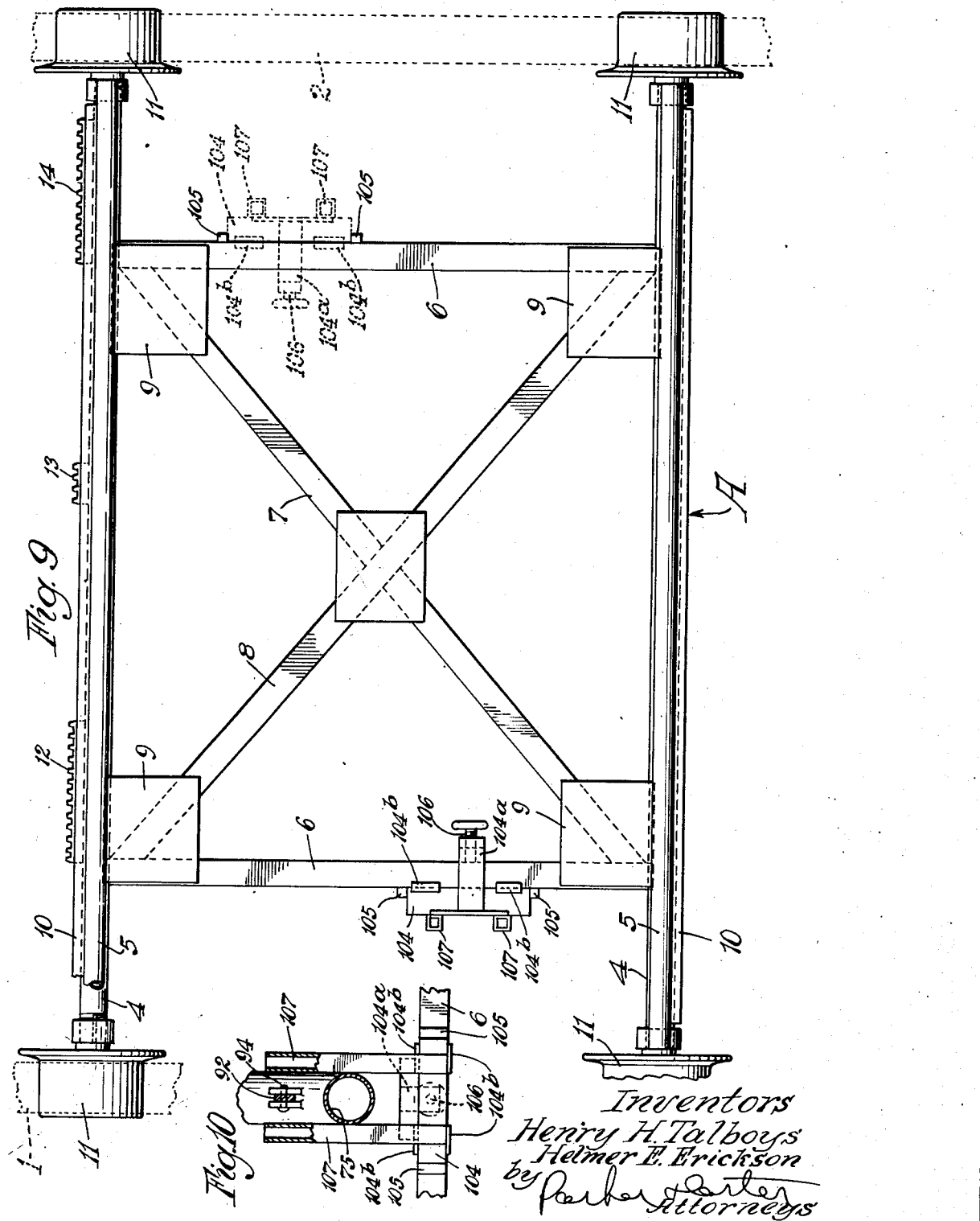

Dec. 12, 1944.     H. H. TALBOYS ET AL     2,364,879
RAIL GRINDER
Filed Jan. 7, 1942     8 Sheets-Sheet 7
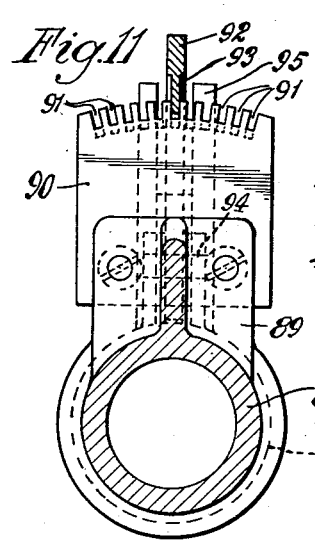
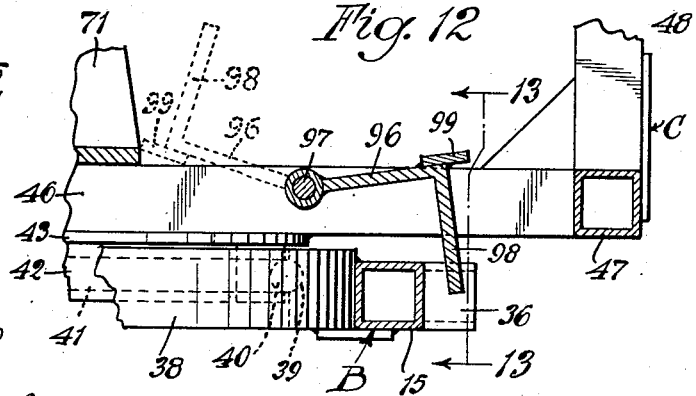
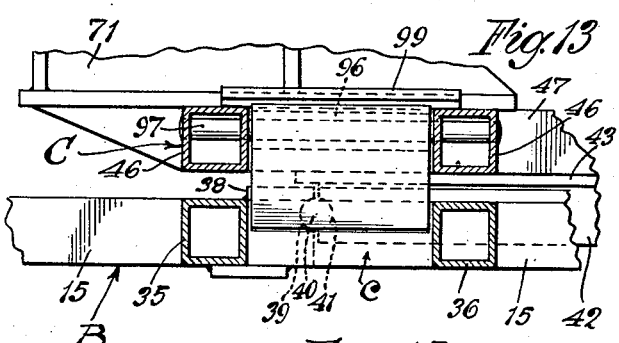
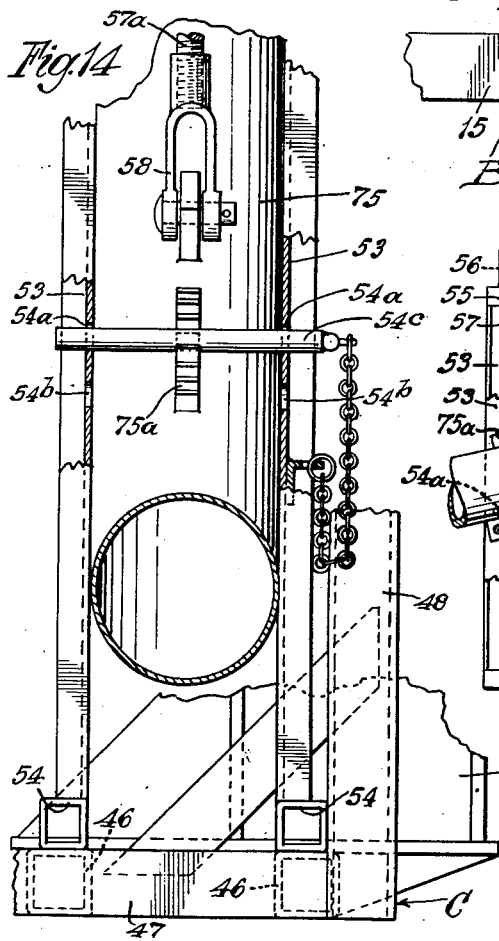
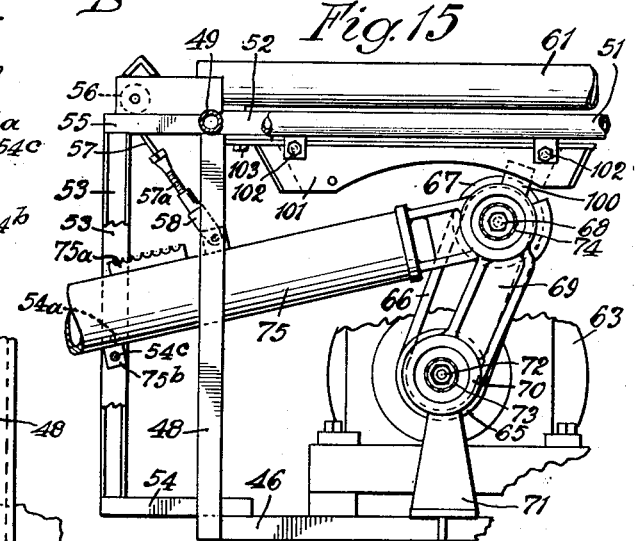
Inventors.
Henry H. Talboys
Helmer E. Erickson
by Parker & Carter
Attorneys.

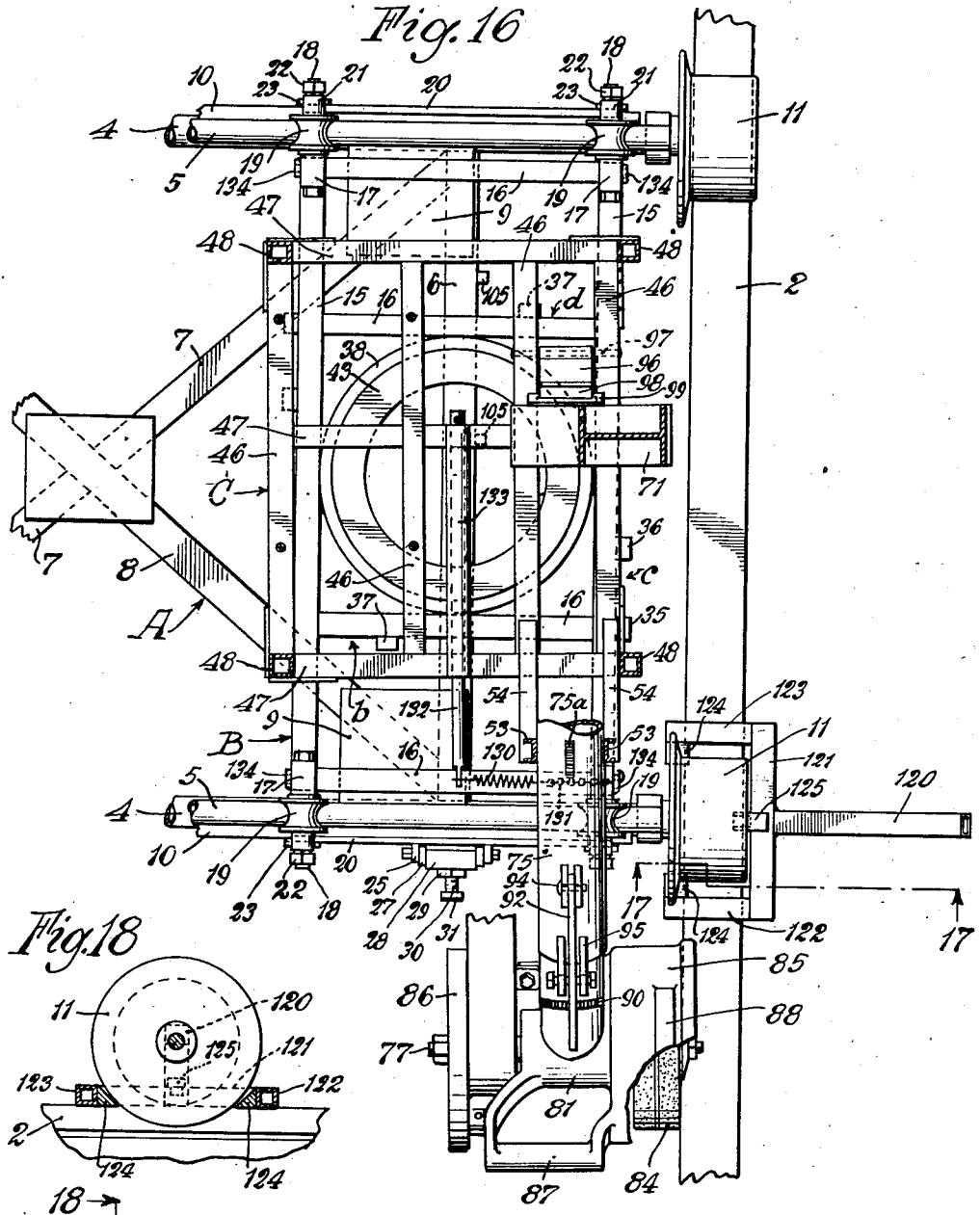

Patented Dec. 12, 1944

2,364,879

UNITED STATES PATENT OFFICE 2,364,879

RAIL GRINDER

Henry H. Talboys and Helmer E. Erickson, Milwaukee, Wis., assignors to Nordberg Manufacturing Co., Milwaukee, Wis., a corporation of Wisconsin Application January 7, 1942, Serial No. 425,845

28 Claims. (Cl. 51—178)

This invention relates to an improvement in track grinders and has for one purpose the provision of a track or rail grinder which is compact, efficient and easily operated.

Another purpose is the provision of improved means for adjusting the grinding tool in relation to the supporting frame riding upon the rails of a track.

Another purpose is the provision of improved means for varying or controlling the angle of the grinding tool in relation to either rail of a track.

Another purpose is the provision of improved drive means for the grinding tool.

Another purpose is the provision of improved means for movably mounting the grinding tool in relation to the power plant and power plant supporting means of the grinder.

Another purpose is the provision of improved means for permitting movement or adjustment of the grinding tool while maintaining an uninterrupted efficient driving connection between the tool and the power plant.

Other purposes will appear from time to time in the course of the specification and claims.

The invention is illustrated more or less diagrammatically in the accompanying drawings wherein:

Fig. 1 is an end view of the track grinder, with parts in vertical transverse section;

Fig. 2 is a plan view;

Fig. 3 is a section on the line 3—3 of Fig. 1;

Fig. 4 is a section on an enlarged scale on the line 4—4 of Fig. 1;

Fig. 5 is a section on a still larger scale on the line 5—5 of Fig. 4;

Fig. 6 is a section on the line 6—6 of Fig. 3;

Fig. 7 is a detail;

Fig. 8 is a section on an enlarged scale on the line 8—8 of Fig. 6;

Fig. 9 is a plan view of the lower main frame or carriage;

Fig. 10 is a section on the line 10—10 of Fig. 1;

Fig. 11 is a section on the line 11—11 of Fig. 5;

Fig. 12 is a section on an enlarged scale on the line 12—12 of Fig. 3;

Fig. 13 is a section on the line 13—13 of Fig. 12;

Fig. 14 is a section on an enlarged scale on the line 14—14 of Fig. 1;

Fig. 15 is a partial view similar to Fig. 1, with parts in different position;

Fig. 16 is a section taken substantially on the line 16—16 of Fig. 1, with parts broken away, illustrating the grinding tool in a different position;

Fig. 17 is a section on the line 17—17 of Fig. 16; and

Fig. 18 is a section on the line 18—18 of Fig. 17.

Like parts are indicated by like symbols throughout the specification and drawings.

Referring to the drawings, 1, 2 illustrate the rails of a track, mounted on any suitable members, such as the ties 3. Riding on the rails is a main frame generally indicated as A and including a pair of generally parallel transversely extending tubes 4, each of which has superposed above it and secured to it, as by welding, a somewhat smaller tube 5. The side frame members thus formed may be connected for example by parallel longitudinally extending members 6, herein shown as square tubing.

7, 8 are transversely extending braces, and tie plates 9 are employed at the corners and center of the frame thus formed. Connected along each pair of tubes 4, 5 and extending outwardly therefrom is an angle 10, the purpose of which will later appear.

The rail engaging flanged wheel 11 is herein shown as rotatably mounted at each end of each of the tubes 4. These wheels may be electrically insulated in any suitable manner from the frame A. Located along one of the tubes 4 at one end of the main frame are a plurality of racks 12, 13 and 14.

Mounted for transverse movement in relation to the main frame A is the sub-frame or carriage generally indicated as B and including a pair of frame members shown as square bars 15, 15, which may be connected by any suitable cross bars or cross members 16, 16, of which four are illustrated in Fig. 6. The ends of the cross bars 15 carry blocks 17, which carry pins 18, associated with which are channeled wheels 19, formed to fit the upper surfaces of the rods or tubes 5 of the main frame A, as shown for example in Fig. 8. At one end of the sub-frame B, as shown at the left hand of Fig. 6 and as shown in detail in Fig. 7, is a cross member 20, having at each end a sleeve 21 which is adapted to slip over the end of one of the pins 18 and to be held in position for example by any suitable securing nut or means 22.

Associated with and fixed in relation to the sleeves 21 are downwardly and inwardly extending securing brackets 23, the lower and inwardly extending flanges 24 of which penetrate beneath the angle of the member 10, and therefore preventing unintended upward bodily movement of the end of the sub-frame B. An identical structure is shown also at the opposite end of the sub-frame B, as shown in Fig. 6, but to the member 20 thereof is secured a pair of ears 25, through which pass any suitable pin or bolt 26, on which is pivoted ears or lugs 27, connected to an angle member 28, the lower flange of which is provided with a nut or screw threaded abutment member 29, fixed to the angle member 28. Screw threaded for passage therethrough is a securing screw 30, having any suitable manipulating head 31. The inner end of the screw 30 abuts against an angle member 32, provided with a sleeve 33, pivoted on a pin 34 located below the pin 26 extending into the ears 27. It will be understood that a clamp is thus provided for clamping a structure in relation to the angle 10, as shown in Fig. 8. The thrust of the screw 30 urges the upper flange of the angle 32 against the lower face of the outwardly extending flange of the angle 10 and locks it against the upper arm of the angle 28. This structure permits the sub-frame to be located at any desired point in its movement across the main frame A and between the rails of the track.

Welded or otherwise secured to the opposite outer sides of the members 15 are square tubing extensions 35, 36. Extending outwardly from the opposite sides of the two inner members 16 are similar square tubing extensions 37, the purpose of which will later appear.

Mounted within the two inner members 16 and the side members 15, as shown in Fig. 3 and Fig. 6, is a circumferential ring 38, which forms part of the ball race, being channeled at 39 to receive balls 40, the opposite sides of which penetrate a corresponding channel 41 in a central ring 42 having an upper flange 43. Mounted upon and secured to this upper flange 43 is the upper frame assembly generally indicated as C and shown for example in Fig. 3. The balls may be admitted to the space between the rings 39 and 42 through an aperture 44, which may be closed by any suitable plug or closure 45.

The upper frame C is shown as including four horizontal parallel square tube members 46, which may be connected by any suitable transverse members 47. Four vertical posts 48 may be employed, the upper ends of which may be connected by transversely extending handlebars or tubes 49, which may be connected in any suitable manner, as by straps 50, and have connecting end pieces 51 at each end thereof. Additional cross bars 52 are also shown in Fig. 3 adjacent but not at the mid points of the bars 49. As shown for example in Figs. 2 and 3, a grinder arm guide structure is employed, having a pair of vertically extending guide members 53, supported at top and bottom, as shown in Fig. 1, by outwardly extending bottom supports 54 and outwardly extending top supports 55, which are welded to the frame assembly C. Pivoted at or above the members 55 is a sheave 56, about which passes any suitable supporting cable 57, the lower end of which ends in a supporting fork or connection 58, associated with the grinder arm structure later described. The upper end of the cable 57 terminates in a securing member 59, to which is secured the coil spring 60 housed within a tube 61 and secured at its outer end, as at 62. The tube 61 may be welded or otherwise suitably secured in relation to the bars 49.

Mounted on the sub-frame C in any suitable manner is a motor 63, having a drive shaft 64 and a drive pulley 65, which takes belts 66, which in turn pass about a driven pulley 67, herein shown as having two sets of channels for the three belts 66. The pulley 67 is mounted for rotation with the shaft 68. The shaft 68 is mounted for rotation in a fork including the members 69 extending from a hub structure 70, which is mounted for rotation in relation to a projection 71 upwardly from the bottom of the sub-frame C. Illustrated for example is the shaft 72 and ball bearing assemblies 73. The shaft 68 is supported in the member 69 by upper ball bearing assemblies 74. Pivoted on the shaft 68 is the grinder arm 75, on which are the ball bearing assemblies 76. Mounted for rotation on the outer end of the arm 75 is the grinder shaft 77, mounted in ball bearing assemblies 78 and carrying a pulley 79, about which pass the belts 80, the opposite ends of which pass around a portion of the pulleys 67 above referred to. Thus an articulated drive is provided for the grinder shaft 77 from the motor.

It will be observed that the shaft 72 is concentric with the drive shaft 64 of the motor 63, as shown for example in Fig. 4. The shaft 77 is mounted in a head assembly 81, which may be mounted for rotation in relation to the arm 75. The arm 75 is illustrated as tubular, and the assembly 81 as having a telescoping portion 82 penetrating the outer end of said tube.

Any suitable grinding members may be secured on the shaft 77 at either end thereof. Illustrated in Fig. 4 are a simple slotting disc 83 at one end of the shaft, and a multiple grinding disc 84 secured at the opposite end of the shaft. It will be understood, of course, that the grinding members are replaceable and removable, and any suitable securing means may be employed therefor.

Guards may be employed for the wheels, as indicated at 85 and 86. The guard 86 is illustrated as removably mounted. 87, 88 indicate any suitable handles mounted on or integral with the assembly 81 for controlling the position of the grinding head and the grinding tool. In order to control the rotation of the assembly 81 in relation to the tube 75, locking means are provided, including the lug 89, upon which is mounted a segment 90 having a plurality of adjustment slots 91 at the outer arcuate surface thereof. These slots are adapted selectively to receive a locking member 92, having a slot penetrating reduced portion 93, the member 92 being pivoted to the arm 75, as at 94. Any suitable lateral guides and confining means for the pivoted member 92 may be provided, as at 95. The arm 75 is guided between vertical frame members 53 on the frame C, connected at their lower and upper ends, respectively, to the members 54 and 55. These arms are provided with apertures 54a and 54b, through which an adjusting pin 54c may pass. The pin is adapted for engagement with the rack 75a when the arm is in the position in which it is shown in Fig. 1. It serves then to hold it in an adjusted downward position. Or the arm 75 can be moved to the position in which it is shown in Fig. 15, in which case it may be held inoperative by the pin 54c, which penetrates an apertured lug 75b on the arm 75. It will be understood that the spring 60, through the tension member 57 and the securing fork 58, tends to rotate the arm 75 to an elevated position. The effect of the spring may be varied in any suitable manner either by adjusting the abutment 62 of the spring, or, as shown in Fig. 1, by adjusting the connection between the tension member 57 and the member 58, a screw threaded adjusting connection being shown as at 57a. It will be understood that the pin 54b may be held in inoperative position, and in many of the operations of the grinder it is not employed at all. It is effective, for example, in holding the grinding mechanism in a fixed position when operating on the side of a rail and when no vertical movement of the grinder is desired.

The sub-frame C may be locked in any one of four positions about its axis of rotation, indicated for example at X in Fig. 6. Mounted on the bottom frame members 46 is a pivoted locking member generally indicated as 96, shown as pivoted, as at 97, in Fig. 12, and is provided with a downwardly extending portion 98 adapted to penetrate between the members 35 and 36, as shown at two points in Fig. 6, or between the members 15 and 37, also as shown in Fig. 6, these locking areas being indicated as a, b, c and d in Fig. 6. The locking member may be swung up into inoperative position, as shown in dotted line in Fig. 12, which permits unimpeded rotation of the sub-frame C and the parts carried thereon. 99 indicates any suitable flange or abutment which may if desired be used as a hand piece, and also as a limiting stop for limiting the downward movement, as shown in Fig. 12.

The arm 69 is also provided with guiding means, including a projection 100, shown for example in Figs. 3 and 15, which travels in a guiding channeled structure, including the spaced members 101. The guiding member may be adjusted, for example, by any suitable set screw or adjusting member 102, and may be bolted in position, as by any securing bolt or securing means 103, which hold it against the members 52.

Mounted on the longitudinal frame member 6 of the main frame A are additional guiding means for the outer end of the arm 75. As shown for example in Fig. 9, an abutment member 104 is illustrated which is contained between fixed positioning members 105 on the frame member 6 and removably locked in position, as by any suitable screw 106, on an arm 104a integral with the member 104. The member 104 carries a pair of uprights 107, adapted to receive between them the arm 75, as shown for example in Fig. 10. When the members 107 are in position, they permit an up and down movement of the arm 75, while preventing any lateral deflection. The abutment member 104 is provided with lugs 104b to engage the upper and lower faces of the frame members 6. It will be noted that both frame members 6 are provided with fixed positioning members 105. Two of such abutment members 104 may be employed as shown in Fig. 1.

Under some circumstances it is advantageous, for example when grinding the inside of the rail, to advance the grinding mechanism as a whole slowly along the rail, and to control its movement precisely along the rail, and lock it in position where necessary. In order to permit such precise and relatively slow movement of the mechanism as a whole along the track, a manually operable control member or clamp is provided, including a handle portion 120, a transverse frame member 121, and inwardly extending forks 122, 123. These forks are provided with wedge-like wheel engaging members or portions 124. 125 is a lug or offset inwardly extending from the top of the member 121, midway between the forks 122, 123. The fork may be employed as a locking means by pushing down on the handle 120, which tilts the forks 122, 123, and raises the wedge portions 124 into locking engagement with the flange of the supporting wheel. Meanwhile the intermediate portions of the members 122, 123 engage the top of the rail, and the result is a locking of the whole assembly against movement along the track, which is effected by the member 120, which can be controlled by the operator with one hand while with the other hand he manipulates the grinder unit. The handle 120 and the forks can also be used as a means for moving the frame longitudinally along the track, which is advantageous where relatively short and closely controlled longitudinal movement of the grinder is desired.

For example, as shown in Fig. 16, when the grinder grinding wheel 84 is engaging the inner face of the rail, it is advantageous to obtain an automatic thrust or a spring controlled thrust of the grinding element against the rail. When this particular operation is being carried out, the arm 75 may be locked in the position in which it is shown in Fig. 1, by the engagement of the pin 54c with the rack 75a. It will be understood, however, that when the parts are in the position of Fig. 1, this particular locking means may not be employed, as in rail slotting or grinding off the ends of the rails the outer end of the arm 75 is raised and lowered or is moved transversely across the top of the rail, or both. However, when the parts are in the position of Fig. 16, the particular locking means above discussed are employed to hold the lower end of the arm 75 in such position that the grinding element 84 engages the inner face of a rail.

Whether the end of the arm 75 is held down in the above fashion, or whether it is manually held down, it is advantageous to provide a spring thrust of the grinder against the side of the rail, and this is provided by the employment of a spring 130, associated with an adjusting chain 131. The spring 130 is shown as secured to a rod 132, telescoped in a guiding sleeve 133 on the turntable or frame assembly C. The adjusting chain portion of the spring assembly may be hooked into or secured to a link 134 on the frame assembly B, as shown in Figs. 3, 6 and 16. The effect of the spring is to rotate the turntable structure in such direction as to exert a thrust of the grinding member 84 against the inner face of the rail. If the arm 75 is at that time locked in downward position, all that the user has to do is to move the main frame as a whole along the rail.

While the parts are illustrated in side grinding position in Fig. 16, and the locking member 121 is also illustrated in position, it will be understood that this is merely for convenience in illustration, as it may not be desirable to use the locking means in connection with side grinding, or it may be desirable to use the locking means in connection with other operations. It will be understood that when the parts are in the position of Fig. 16 for grinding the inside of the rail, the turntable is not locked in relation to the sub-frame B, but is free to turn as far as the engagement of the grinding member with the rail will permit under the yielding urge of the spring 130. It will be understood that, when grinding a frog or switch point, the relationship shown in Fig. 16 may be reversed so that the spring 130 may be connected to the opposite link 134 at the left-hand of the figure, in order to impart a leftward rather than a rightward thrust to the grinder.

It will be realized that, whereas a practical and operative device is described and illustrated, nevertheless many changes may be made in the size, shape, number and disposition of parts without departing from the spirit of the invention. It is therefore wished that the description and drawings be taken as in a broad sense illustrative or diagrammatic, rather than as a limitation to the precise showing.

The use and operation of the invention are as follows: -

In general three main assemblies are provided namely, the main frame A, which rides on the rails and moves longitudinally along the rails, the sub-frame B, which rides on the main frame and moves transversely across the track, and the turntable assembly C, which is mounted for rotation about a vertical axis on the sub-frame B. The turntable may be locked at a choice of four positions on the sub-frame, these positions being separated by 90° arcs. The arm 75 may be locked in predetermined position, as when doing the grinding shown in Fig. 16, or it may be freely guided for vertical and transverse movement, as by the verticals 107. Or it can be locked in raised position when the device is being moved along the track. The transversely extending sub-frame B may be locked at any desired position in its transverse path across the main frame A. Also, the grinding head in general may be rotated about in relation to the arm 75 to permit tilting of the cutting or grinding plane from the vertical.

The assembly herein described and shown can be advantageously used for grinding sides of rails and tops of the rails. The grinding element may be moved longitudinally along the rail during grinding, or it may be moved transversely across the rail during grinding. It may be used to slot rails, or to grind off the ends of rails. It may be tilted to grind down rail ends or rail sides.

What is claimed is:

1. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, means for rotating it, and means for supporting the inner end of said arm, including a pivoted link upwardly extending from the turntable, the inner end of the arm being pivoted to the upper end of the link.

2. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane means for supporting its inner end, including a pivoted link the lower end of which is pivoted to the turntable, a grinding member on said arm, and means for rotating said grinding member, including a power plant on the turntable, having a drive shaft and a drive pulley, a driven pulley generally coaxial with the connection between the upper end of the pivoted link and the inner end of the arm, flexible driving connections passing about said pulley and the drive pulley, an additional driven pulley associated with the grinding member, and an additional flexible driving connection extending about said first mentioned driven pulley and said last mentioned driven pulley.

3. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, and means for rotating it, and means for supporting the inner end of said arm, including a pivoted link upwardly extending from the turntable, the inner end of the arm being pivoted to the upper end of the link, and means for locking said arm in relation to said turntable and for thereby preventing its oscillation.

4. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, and means for rotating it, and means for supporting the inner end of said arm, including a pivoted link upwardly extending from the turntable, the inner end of the arm being pivoted to the upper end of the link, and guiding means for permitting oscillation of said arm and link while preventing their lateral displacement from their normal plane of oscillation.

5. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, a grinder head upon which said grinding member is journaled, said grinder head being mounted for rotation in relation to said arm about an axis generally parallel with the long extension of said arm, and means for adjustably securing said head against such rotation.

6. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, a grinder head upon which said grinding member is journaled, said grinder head being mounted for rotation in relation to said arm about an axis generally parallel with the long extension of said arm, and means for adjustably securing said head against such rotation, including a notched segment and a pivoted detent adapted selectively to penetrate the notches of said segment.

7. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, and means for rotating it, and means for yieldingly urging said turntable to rotation in a predetermined direction and for thereby urging the grinding member against the side of a rail of said track.

8. In a rail grinder, a main frame, means for movably supporting it on the rails of a track, a sub-frame, means for movably supporting it on the main frame for movement transversely of the track, a turntable on the sub-frame, an arm on said turntable mounted for oscillation in a generally vertical plane, a grinding member on said arm, and means for rotating it, and means for yieldingly urging said turntable to rotation in a predetermined direction and for thereby urging the grinding member against the side of a rail of said track, including a coil spring, means for securing one end of said spring to the turntable, and means for securing the other end of said spring to the sub-frame.

9. In a rail grinder structure, a grinder arm mounted for oscillation in a generally vertical plane, vertical guides adapted to permit such oscillation while preventing lateral displacement of the arm from its plane of oscillation, and means interposed between said vertical guides and said arm for locking said arm against such vertical oscillation.

10. In a rail grinder structure, a grinder arm mounted for oscillation in a generally vertical plane, vertical guides adapted to permit such oscillation while preventing lateral displacement of the arm from its plane of oscillation, and means interposed between said vertical guides and said arm for locking said arm against such vertical oscillation, including a pin removably positioned on, and extending between said guides.

11. In a rail grinder structure, a grinder arm mounted for oscillation in a generally vertical plane, vertical guides adapted to permit such oscillation while preventing lateral displacement of the arm from its plane of oscillation, and means interposed between said vertical guides and said arm for locking said arm against such vertical oscillation, including a pin removably positioned on, and extending between said guides, and a rack, on said arm, opposed to said pin.

12. In a rail grinder, a main frame, means for movably supporting it on the rails of a track, a sub-frame, means for movably supporting it on the main frame for movement transversely of the track, an arm on said sub-frame mounted for oscillation in a generally vertical plane, a grinding member on said arm, means for rotating it, and means for supporting the inner end of said arm, including a pivoted link upwardly extending from the sub-frame, the inner end of the arm being pivoted to the upper end of the link, the means for rotating the grinding member including a power plant on the sub-frame, having a drive shaft and a drive pulley, a driven pulley generally coaxial with the connection between the upper end of the pivoted link and the inner end of the arm, flexible driving connections passing about said pulley and the drive pulley, an additional driven pulley associated with the grinding member, and an additional flexible driving connection extending about said first mentioned driven pulley and said last mentioned driven pulley.

13. In a rail grinder, a main frame adapted to span the rails of a track, means for movably supporting the frame on the track, a sub-frame transversely movable on the main frame, a turntable on the sub-frame, an arm on the turntable mounted for oscillation about a generally horizontal pivot and for endwise movement in a generally vertical plane, a grinding member on said arm, and means for rotating it, means for locking the sub-frame, with the turntable located selectively midway between the rails or adjacent either of the rails, and means for selectively locking the turntable with the arm generally parallel with the rail when the sub-frame is located adjacent a rail, and with the arm generally perpendicular to the vertical planes of the rails when the sub-frame is located intermediate the rails.

14. In a rail grinder, a main frame adapted to span the rails of a track, means for movably supporting the frame on the track, a sub-frame transversely movable on the main frame, a turntable on the sub-frame, an arm on the turntable mounted for oscillation about a generally horizontal pivot, a grinding member on said arm, and means for rotating it, means for locking the sub-frame, with the turntable located selectively midway between the rails or adjacent either of the rails, and means for selectively locking the turntable with the arm generally parallel with the rail when the sub-frame is located adjacent a rail, and with the arm generally perpendicular to the vertical planes of the rails when the sub-frame is located intermediate the rails.

15. In a rail grinder, a main frame and means for movably supporting it on the rails of a track, a sub-frame mounted on the main frame for movement transversely of the track, a turntable on the sub-frame, an arm, and an intermediate connection between the arm and the turntable including a member movably mounted on the turntable, the inner end of the arm being rotatably mounted on said member for rotation about a generally horizontal axis, a grinding member mounted on an outer portion of the arm for rotation about a generally horizontal axis and means for rotating it.

16. In a rail grinder, a main frame and means for movably supporting it on the rails of a track, a sub-frame mounted on the main frame for movement transversely of the track, a turntable on the sub-frame, an arm, and an intermediate connection between the arm and the turntable including a member movably mounted on the turntable, the inner end of the arm being rotatably mounted on said member for rotation about a generally horizontal axis, a grinding member mounted on an outer portion of the arm for rotation about a generally horizontal axis and means for rotating it, selective means for locking the turntable in relation to the sub-frame with the plane of movement of the arm parallel with the track rails and with the plane of movement of the arm generally at right angles with the track rails.

17. In a rail grinder, a main frame and means for movably supporting it on the rails of a track, a sub-frame mounted on the main frame for movement transversely of the track, a turntable on the sub-frame, an arm, and an intermediate connection between the arm and the turntable including a member movably mounted on the turntable, the inner end of the arm being rotatably mounted on said member for rotation about a generally horizontal axis, a grinding member mounted on an outer portion of the arm for rotation about a generally horizontal axis and means for rotating it, and means for locking the sub-frame selectively in an intermediate position between the two rails of the track, or adjacent either rail of the track.

18. In a rail grinder, a main frame and means for movably supporting it on the rails of a track, a sub-frame mounted on the main frame for movement transversely of the track, a turntable on the sub-frame, an arm, and an intermediate connection between the arm and the turntable including a member movably mounted on the turntable, the inner end of the arm being rotatably mounted on said member for rotation about a generally horizontal axis, a grinding member mounted on an outer portion of the arm for rotation about a generally horizontal axis and means for rotating it, and means for yieldingly supporting said arm while permitting intended downward manual movement of the outer end of the arm.

19. In a rail grinder, a main frame and means for movably supporting it on the rails of a track, a sub-frame mounted on the main frame for movement transversely of the track, a turntable on the sub-frame, an arm, and an intermediate connection between the arm and the turntable, the inner end of the arm being rotatably mounted on said member for rotation about a generally horizontal axis, a grinding member mounted on an outer portion of the arm for rotation about a generally horizontal axis and means for rotating it, and means for yieldingly supporting said arm while permitting intended downward manual movement of the outer end of the arm, including a support upwardly extending from the turntable, and a coil spring extending between said support and an intermediate portion of the arm.

20. In a rail grinder, a main frame, means for movably supporting it on the rails of a track, a sub-frame, means for movably supporting it on the main frame for movement transversely of the track, an arm on said sub-frame, means for mounting it both for vertical oscillation and for transverse movement, in relation to said sub-frame, in a generally vertical plane generally at right angles to the rails of the track including a connecting member to which the inner end of the arm is pivoted for rotation about a generally horizontal axis and means for movably securing said connecting member upon said sub-frame, and a grinding member on said arm, and means for rotating it.

21. In a rail grinder, a main frame, means for movably supporting it on the rails of a track, a sub-frame, means for movably supporting it on the main frame for movement transversely of the track, means for locking said sub-frame, selectively in an intermediate position between the rails of the track, and adjacent their rails, a turntable on said sub-frame, an arm on said turntable, means for mounting it both for vertical oscillation and for transverse movement in relation to said sub-frame, in a generally vertical plane, including a connecting member to which the inner end of the arm is pivoted for rotation about a generally horizontal axis and means for movably securing said connecting member upon said turntable, and a grinding member on said arm, and means for rotating it.

22. In a rail grinder, a main frame, means for movably supporting it on the rails of a track, a sub-frame, means for movably supporting it on the main frame for movement transversely of the track, means for locking said sub-frame, selectively in an intermediate position between the rails of the track, and adjacent their rails, a turntable on said sub-frame, an arm on said turntable, means for mounting it both for vertical oscillation and for transverse movement in relation to said sub-frame, in a generally vertical plane, including a connecting member to which the inner end of the arm is pivoted for rotation about a generally horizontal axis and means for movably securing said connecting member upon said turntable, and a grinding member on said arm, and means for rotating it, and means for selectively locking said turntable in position with the plane of movement of the arm either parallel with the rails or generally perpendicular to the rails.

23. In a rail grinder, a main frame, means for movably supporting it on the rails of a track, a sub-frame, means for movably supporting it on the main frame for movement transversely of the track, an arm on said sub-frame, means for mounting it both for vertical oscillation and for transverse movement, in relation to said sub-frame, in a generally vertical plane including a connecting member to which the inner end of the arm is pivoted for rotation about a generally horizontal axis and means for movably securing said connecting member upon said sub-frame, and a grinding member on said arm, and means for rotating it.

24. In a rail grinder, a main frame, means for movably supporting it on the rails of a track, a sub-frame, means for movably supporting it on the main frame for movement transversely of the track, an arm on said sub-frame, means for mounting it both for vertical oscillation and for transverse movement, in relation to said sub-frame, in a generally vertical plane including a connecting member to which the inner end of the arm is pivoted for rotation about a generally horizontal axis and means for movably securing said connecting member upon said sub-frame, and a grinding member on said arm, and means for rotating it, and means for selectively positioning said arm for movement in a plane generally at right angles to the rails of the track and for movement in a plane generally parallel with the rails of the track.

25. In a rail grinder, a main frame and means for movably supporting it on the rails of a track, a sub-frame mounted on the main frame for movement transversely of the track, an arm rotatably mounted in relation to the sub-frame, a grinding member mounted on the arm for rotation about a generally horizontal axis, and means for rotating it, guiding means for normally confining the movement of said arm to a generally vertical plane and means for movably securing said arm to said sub-frame including an intermediate oscillatable connecting element between said arm and said sub-frame upon which said arm is mounted for rotation about a generally horizontal axis, said connecting element being oscillatably mounted in relation to said sub-frame whereby said arm is mounted for ready endwise movement during its rotation in its vertical plane.

26. In a rail grinder, a main frame and means for movably supporting it on the rails of a track, and means for locking it against movement in relation to the track, a sub-frame mounted on the main frame for movement transversely of the track, a turntable on the sub-frame, an arm, and an intermediate connection between the arm and the turntable including a member movably mounted on the turntable, the inner end of the arm being rotatably mounted on said member for rotation about a generally horizontal axis, a grinding member mounted on an outer portion of the arm for rotation about a generally horizontal axis and means for rotating it.

27. In a rail grinder, a frame, means for movably supporting it on the rails of a track, an arm on said frame mounted for oscillation in a generally vertical plane, a grinding member on said arm, means for rotating it and means for supporting the inner end of said arm including a pivoted link upwardly extending from the frame, the inner end of the arm being pivoted to the upper end of the link, the means for rotating the grinding member including a power plant on the frame having a drive shaft and a drive pulley, a driven pulley generally coaxial with the connection between the upper end of the pivoted link and the inner end of the arm, flexible driving connections passing about said pulley and the drive pulley, an additional driven pulley associated with the grinding member and an additional flexible driving connection extending about said first mentioned driven pulley and said last mentioned driven pulley.

28. In a rail grinder, a frame, means for movably supporting it on the rails of a track, an arm on said frame mounted for oscillation in a generally vertical plane, a grinding member on said arm, means for rotating it and means for supporting the inner end of said arm including a pivoted link upwardly extending from the frame, the inner end of the arm being pivoted to the upper end of the link, the means for rotating the grinding member including a power plant on the frame having a drive shaft and a drive pulley, a driven pulley generally coaxial with the connection between the upper end of the pivoted link and the inner end of the arm, flexible driving connections passing about said pulley and the drive pulley, an additional driven pulley associated with the grinding member and an additional flexible driving connection extending about said first mentioned driven pulley and said last mentioned driven pulley, and a turntable structure on the frame, on which said power plant and arm are mounted.

HENRY H. TALBOYS.
HELMER E. ERICKSON.